United States Patent
Karam, II

(10) Patent No.: US 7,085,057 B2
(45) Date of Patent: Aug. 1, 2006

(54) DIRECT-WRITE SYSTEM AND METHOD FOR ROLL-TO-ROLL MANUFACTURING OF REFLECTIVE GRATINGS

(75) Inventor: Raymond Miller Karam, II, Santa Barbara, CA (US)

(73) Assignee: Invenios, Santa Barbara, CA (US)

( * ) Notice: Subject to any disclaimer, the term of this patent is extended or adjusted under 35 U.S.C. 154(b) by 0 days.

(21) Appl. No.: 10/686,894

(22) Filed: Oct. 15, 2003

(65) Prior Publication Data

US 2005/0083575 A1   Apr. 21, 2005

(51) Int. Cl.
*G02B 5/18* (2006.01)
(52) U.S. Cl. .................. 359/572; 359/566
(58) Field of Classification Search ............. 359/572, 359/566, 569, 576; 216/24
See application file for complete search history.

(56) References Cited

U.S. PATENT DOCUMENTS

| | | | |
|---|---|---|---|
| 4,708,437 A | 11/1987 | Kraus | 359/572 |
| 4,757,196 A | 7/1988 | Yamada et al. | 250/231.13 |
| 4,846,552 A | 7/1989 | Veldkamp et al. | 359/572 |
| 4,974,962 A | 12/1990 | Stephens et al. | 356/499 |
| 4,975,571 A | 12/1990 | McMurtry et al. | 250/231.16 |
| 5,033,817 A | 7/1991 | Stephens | 359/569 |
| 5,059,499 A | 10/1991 | Teitel | 430/1 |
| 5,331,443 A | 7/1994 | Stanisci | 352/12 |
| 5,364,493 A * | 11/1994 | Hunter et al. | 216/66 |
| 5,629,068 A * | 5/1997 | Miekka et al. | 428/148 |
| 6,291,797 B1 * | 9/2001 | Koyama et al. | 219/121.73 |
| 6,376,799 B1 | 4/2002 | Amako et al. | 219/121.77 |
| 6,445,456 B1 | 9/2002 | Speckbacher et al. | 356/499 |
| 6,514,576 B1 | 2/2003 | Kintaka et al. | 427/555 |
| 6,580,054 B1 * | 6/2003 | Liu et al. | 219/121.68 |
| 2005/0052743 A1 | 3/2005 | Speckbacher | 359/566 |

FOREIGN PATENT DOCUMENTS

JP          05265365 A  * 10/1993

* cited by examiner

*Primary Examiner*—Arnel C. Lavarias
(74) *Attorney, Agent, or Firm*—Buchanan Ingersoll LLC

(57) ABSTRACT

A reflective grating for precision location measurement. In one embodiment, the reflective grating has a non-reflective substrate and a non-reflective adhesion layer disposed on the substrate layer. A reflective surface layer is disposed on the adhesion layer. In another embodiment, the reflective grating is manufactured on the reflective (polished) surface of a monolithic substrate. A series of grating lines are formed in the reflective surface layer by vaporizing portions of the reflective surface layer with a laser in order to expose the non-reflective adhesion layer. Accordingly, alternating reflective and non-reflective grating lines are formed that are used for making precision measurements.

20 Claims, 6 Drawing Sheets

DIRECT-WRITE SYSTEM AND METHOD FOR ROLL-TO-ROLL MANUFACTURING OF REFLECTIVE GRATINGS

FIELD OF THE INVENTION

The present invention relates generally to diffractive gratings and more particularly to a system and method of manufacturing diffractive gratings by directly writing the grating lines onto polished surfaces on monolithic or multilayered substrates with a laser.

BACKGROUND OF THE INVENTION

Industrial automation platforms including industrial robots, machine tools, coordinate measurement machines, semiconductor robots and test/measurement equipment, as well as military fire-control and communication systems such as radar, telescopes, deformable mirror/pointing systems and gun/laser pointing systems, typically employ closed-loop control of linear and rotary translators to achieve sub-micron/sub-microradian precision. In such systems, optical position transducers are used to measure linear and rotary displacements. To achieve the highest resolution, diffraction of coherent light (i.e. from a laser) with a precision grating is used to create the transducer signal. The wavefront diffraction angle sensitivity actually increases with the increasing resolution of the grating by $\sin^{-1}(\lambda/d)$ where $\lambda$ is the wavelength of light and d is the period of the grating.

Typically, the platforms have translators that are mounted in a serial kinematic arrangement that employ one linear translator for each component of translation. Alternatively, large turrets can be employed for the component of translation. In each case, a grating in the form of a long deformable tape provides precision reference information from which a read head can measure the sub-micron incremental displacements.

Referring to FIG. 1, a typical arrangement for a read head 12 and grating 16 is shown. A laser source 10 of a translator-mounted read head 12 generates a transmitted beam 14 of coherent light having a wavelength of about 800–1200 nm onto a reflective diffraction grating 16. The read head 12 moves in the x-axis direction of the translator and experiences lateral displacement relative to the reflective diffraction grating 16 when the translator is moved. The transmitted beam 14 is reflected by the reflective diffraction grating 16 to generate a first ordered pair (+1, −1) of a reflected beam 18. The reflected laser beam 18 is transmitted through a reticle 20 that has a grating pitch equal to the reflective diffraction grating 16. The −1 order of the of the transmitted beam 14 derived from the +1 order of the reflected beam 18 and the +1 order of the transmitted beam 14 derived from the −1 order of the reflected beam 18 interfere with one another.

The read head 12 has a photodiode array 22 located at the point of maximum interference between the +1 and −1 orders and decodes the light pattern to generate a quadrature output having two complex signals $Z_1(x)$ and $Z_2(x)$. The complex signals $Z_1(x)$ and $Z_2(x)$ have the form:

$$Z(x)=A(x)e^{j(2\pi x - vdt)}+B(x) \qquad \text{Eq. 1}$$

where: Z, A and B are complex functions of the displacement x between the read head 12 and the grating 16; the quadrature outputs are the real and imaginary components of Z(x); and x is the instantaneous spatial frequency of the grating structure and v is the relative velocity of the read head with respect to the grating.

As seen in FIG. 2, the two quadrature signals $Z_1(x)$ and $Z_2(x)$ roughly vary sinusoidally with the orthogonal displacement (x) of the read head 12 with respect to the reflective grating 16. The photodiode array 22 combines the light intensity patterns such that $Z_1(x)$ and $Z_2(x)$ are displaced by a phase angle of 90°. By using A/D converters with N bit resolution to quantize the quadrature signals $Z_1(x)$ and $Z_2(x)$, displacements along the x-axis can be measured with a resolution of roughly 1 part in $2^{N+1}$. Without initializing the displacement at an absolute reference point, the displacement serves as a relative position with respect to an arbitrary starting point.

In addition to measuring incremental displacement, it is necessary for the control system to employ additional sensors that sense home (i.e., origin of coordinate reference frames) and end-of-travel limits. In more advanced systems, the position transducer (i.e., the read head 12) can be configured to provide absolute position information or to provide secondary tracks from which the home and end-of-travel limits can be detected.

As such, there is a need for a reflective diffraction grating that can be used with read heads to measure the displacement of industrial platforms. Typically, reflective diffraction gratings are manufactured using a "chrome-on-glass" process and selective etching using photolithographic techniques and "Zerodur" class having a coefficient of thermal expansion (CTE)<1 ppm/° C. These types of gratings are expensive and require relatively long manufacturing cycles. Furthermore, high tooling costs (e.g., masks) and high capital costs (e.g., vacuum and other sophisticated equipment employed in traditional semiconductor fabrication) are required. With these batch processes, the length of the grating is limited by the size of the chambers used. Therefore, these reflective gratings are expensive to fabricate.

Alternatively, it is possible to machine the gratings into a simple material substrate. The gratings are machined using microreplication or diamond machining techniques that require the substrate to meet broad and disparate material requirements. Accordingly, these machining processes are expensive and time consuming to perform and can suffer cyclic errors every microreplication rotation of the master.

Accordingly, there is a need for a system and method of producing a reflective grating which is quick and economical. Furthermore, there is a need for a process of fabricating diffraction gratings of variable length from centimeters to tens of meters long. The present invention addresses these needs by providing an inexpensive process of manufacturing reflective gratings that employs a laser to write the diffraction pattern onto a polished substrate in a roll-to-roll process thereby avoiding mask costs, machining and high capital investment. In alternate embodiments, the diffraction pattern can be directly written onto polished translator surfaces and/or bearing elements to reduce parts count and assembly time.

SUMMARY OF THE INVENTION

In accordance with the present invention, there is provided a reflective diffraction grating for precision location measurement. The diffraction grating has a non-reflective substrate layer and a non-reflective adhesion layer disposed on the substrate layer. A reflective surface layer is disposed on the adhesion layer. A series of grating lines are formed in the reflective surface layer by removing portions of the reflective surface layer with a laser in order to expose the underlying non-reflective adhesion layer. It is also possible that some of the adhesion layer may be removed with the laser when forming the grating lines. In an alternate embodiment, a polished monolithic substrate may be employed directly in the laser writing. The advantage of the former is that is provides 1.5-2 times the resolution of the monolithic embodiment. The advantage of the latter is reduced cost in relation to the multi-layer embodiment.

Typically, the substrate is a material with a low coefficient of thermal expansion and is a good absorber of IR radiation. Invar or Super Invar are ideal low CTE materials. However, other IR absorbing substrate materials may be substituted without loss of functionality. The adhesion layer is deposited on the substrate and is a material such as nickel that also absorbs IR radiation and removes surface imperfections in the substrate. Such imperfections (e.g., scratches and indentations) are common in Invar, Super Invar and other ideal substrate materials. The surface layer is deposited on the adhesion layer and is a good reflector of IR radiation such as gold. By removing the surface layer to expose the underlying adhesion layer, alternating bands of reflective and non-reflective surfaces are created thereby creating the diffraction grating.

The diffraction grating may further include a contact adhesive layer for adhering the diffraction grating to desired objects. The contact adhesive layer is applied to a side of the substrate opposite the adhesion layer and surface layer. The contact adhesive layer provides an easy method of affixing the diffraction grating to stationary (e.g., mounting plate or stator) or moving (e.g., rotor) reference surfaces.

A method of forming a diffraction grating from a tape having a non-reflective substrate layer, a non-reflective adhesion layer and a reflective surface layer is disclosed. The diffraction grating is formed by vaporizing portions of the surface layer with a laser in order to create the grating lines of the diffraction grating. In the preferred embodiment, the laser is a high frequency laser that generates a pulse that is power loaded in the front-end and vaporizes the surface layer rather than ablating it.

A system for forming a diffraction grating has a feed roll having a tape rolled thereon. The tape has a non-reflective substrate layer, a non-reflective adhesion layer, and a reflective surface area bonded together. A drive roller retrieves the tape from the feed roll. A laser station vaporizes the surface layer in order to create the grating lines. A take up reel rolls the tape after being processed by the laser station. The system can further include a read head for verifying whether the grating lines are properly formed after vaporization by the laser station. A contact adhesive feed roll has a supply of contact adhesive tape that is applied to the side of the substrate opposite the adhesion and surface layers.

BRIEF DESCRIPTION OF THE DRAWING FIGURES

These, as well as other features of the present invention, will become more apparent upon reference to the drawings wherein.

DETAILED DESCRIPTION OF THE INVENTION

Figure 1:
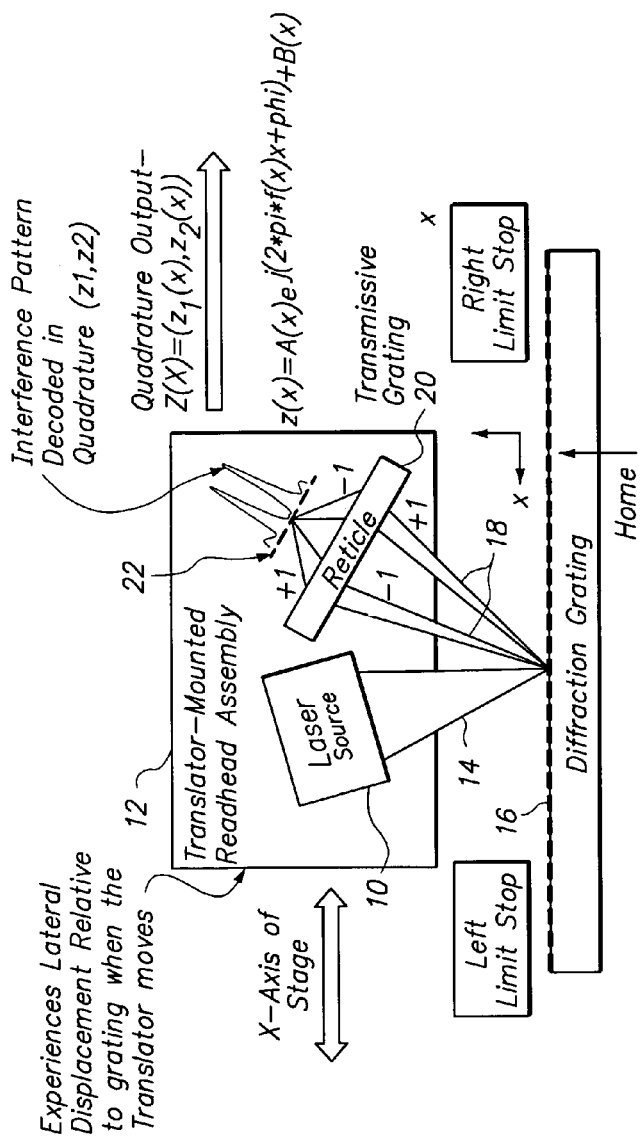
FIG. 1 is a system block diagram illustrating how a diffraction grating system measures position information.
Figure 2:
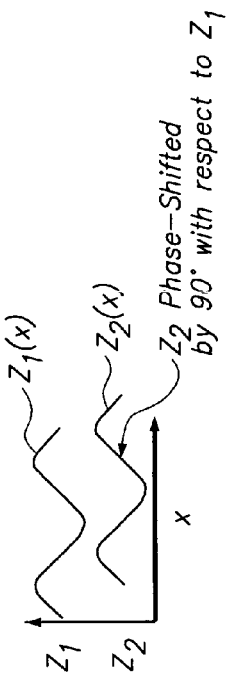
FIG. 2 is a graph showing the two signals generated by a read head of the diffraction grating system shown in FIG. 1.
Figure 3:
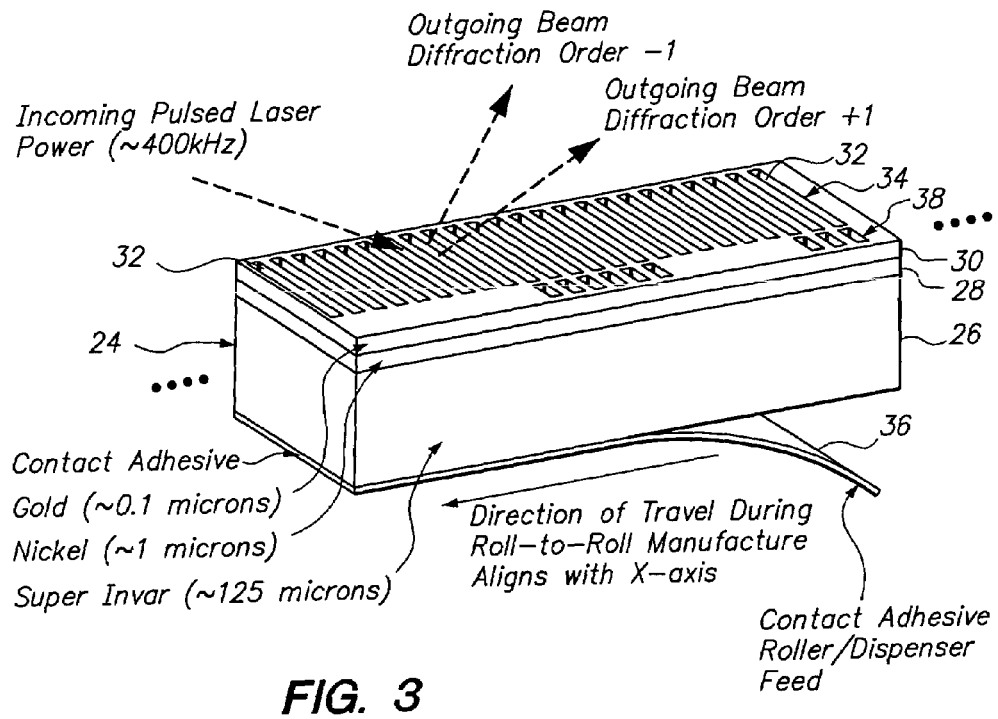
FIG. 3 illustrates a reflective diffraction grating of the present invention.

Referring now to the drawings wherein the showings are for purposes of illustrating preferred embodiments of the present invention only, and not for purposes of limiting the same, FIG. 3 illustrates a reflective diffraction grating 24 constructed in accordance with the present invention. The diffraction grating 24 has a substrate 26 made from a material with a low coefficient of thermal expansion (CTE) and low reflectivity. In this regard, the substrate 26 is a strong absorber of infrared radiation (IR). It is possible to use Invar or Super Invar as the substrate 26. If Super Invar is used, then the substrate 26 has a thickness of about 125 microns and a CTE of about 0.1 ppm/° C. while absorbing 90% of the radiation in the 800–1200 nm band. It is also possible to use silicon as the substrate 26 if the grating patterns are written onto disks rather than linear strips.

Bonded to the substrate 26 is an adhesion layer 28 that is a strong absorber of IR. The adhesion layer 28 may, if plated, smooth out surface imperfections (i.e., roughness, scratches) created by the rolling processes that creates the substrate 26. The adhesion layer 28 is as thick as necessary to smooth out surface imperfections if plated. Otherwise, the adhesion layer 28 is as thin as possible when deposited using sputtering or vacuum deposition processes. In the preferred embodiment, the adhesion layer is between 1–3 microns thick and is deposited onto the substrate. Typically nickel is used for the adhesion layer 28.

Disposed on the adhesion layer 28 is a reflective surface layer 30 that is a strong reflector of IR radiation. The surface layer 30 is about 0.1 microns thick and is deposited onto the adhesion layer 28. Typically the surface layer is gold. Materials other than gold can also be used for the surface layer 30. A photo imageable metal oxide deposition could also be applied. The surface layer would be exposed by a laser and then via an etching process the non-exposed portions could be washed away. Alternatively, nanostructured metal coatings could be layered onto the substrate 26. Then, the reflective bands could be imaged, melted and fused to the substrate. The non-exposed material could then be washed away.

Additionally, a surface tape such as Mylar could be applied to the surface layer 30 prior to laser machining. The surface tape would keep the surface layer 30 clean and could provide better edge definition of grating lines. Furthermore, the surface tape could protect the surface layer 30 during rolling and shipping of the diffraction grating 24.

An optional contact adhesive 36 in the form of a tape is applied to a side of the substrate 26 opposite the surface layer 30. The contact adhesive 36 may be discontinuous, glass bead filled epoxy. The contact adhesive 36 is used to secure the substrate 26 of the diffraction grating 24 to a desired location.

The diffraction grating 24 further includes a series of absorbing grating lines 32 formed into the surface layer 30 and all or some of the adhesion layer 28. As will be further discussed below, the grating lines 32 are formed by removing generally rectangular segments of the surface layer 30 and underlying portions of the adhesion layer 28. Each of the grating lines 32 is about 0.1–8 microns in depth. The pitch of the grating lines 32 (i.e., distance between adjacent grating lines) ranges from 1–100 microns with a duty cycle of 50%. Accordingly, the width of the grating lines 32 is about equal to the width of the material remaining between grating lines 32.

As seen in FIG. 3, the diffraction grating 24 is formed as lines/bands orthogonal to the x-axis of the tape surface. Each of the grating lines 32 is formed by removing the surface layer 30 and underlying portions of the adhesion layer 28 in a direction generally orthogonal to the x-axis. The length of each grating line 32 in the direction orthogonal to the x-axis is about the width of the substrate 26. The grating lines 32 formed in the x-axis direction define a position track 34 that is used in position measurement. Because the reflective surface layer 30 has been removed to expose the adhesion layer 28, as well as the substrate 26, each grating line 32 will absorb IR, while the remaining surface layer 30 reflects IR.

Also formed alongside the position track 34 is an auxiliary track 38 that is used to encode absolute position information. The auxiliary track 38 is a pseudo-random binary sequence formed into the surface layer 30 in the same manner as the position track 34. The auxiliary track 38 may be spaced away from the position track 34 as shown in FIG. 3, or can be implemented as a spatially-varying modulation (binary or otherwise) of the length of the grating lines 32. Typically, the binary modulation pattern of the auxiliary track 38 is synchronous and in phase with the position track 34.

Figure 4:
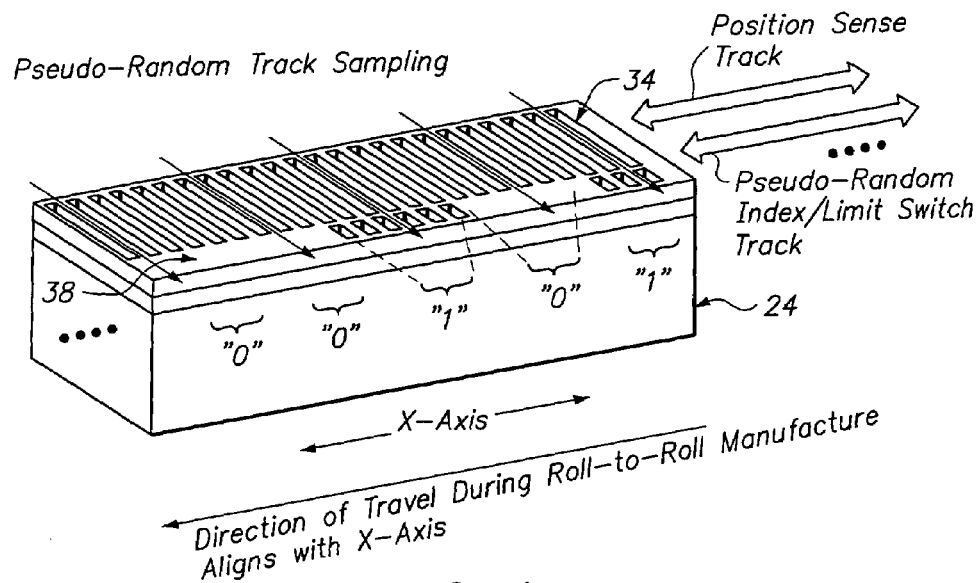
FIG. 4 illustrates an auxiliary track of the diffraction grating shown in FIG. 3.

Referring to FIG. 4, the modulation pattern of the auxiliary track 38 forms "1's " and "0's". The width along the x-axis of the binary "1's" and "0's" is set to be several times (e.g. 4–5 times) larger than the laser spot size of the read head. The binary pattern may be Manchester encoded to be synchronous with a spatial sampling interval that is an integer number of grating periods to ensure that the auxiliary track 38 is constantly modulated even in the cases of long strings of "1's" and "0's". The use of a well known pseudo-random sequence of the binary pattern guarantees that the sequence of "1's" and "0's" for the auxiliary track 38 will not repeat for extremely long sections of the diffraction grating 24.

Figure 5:
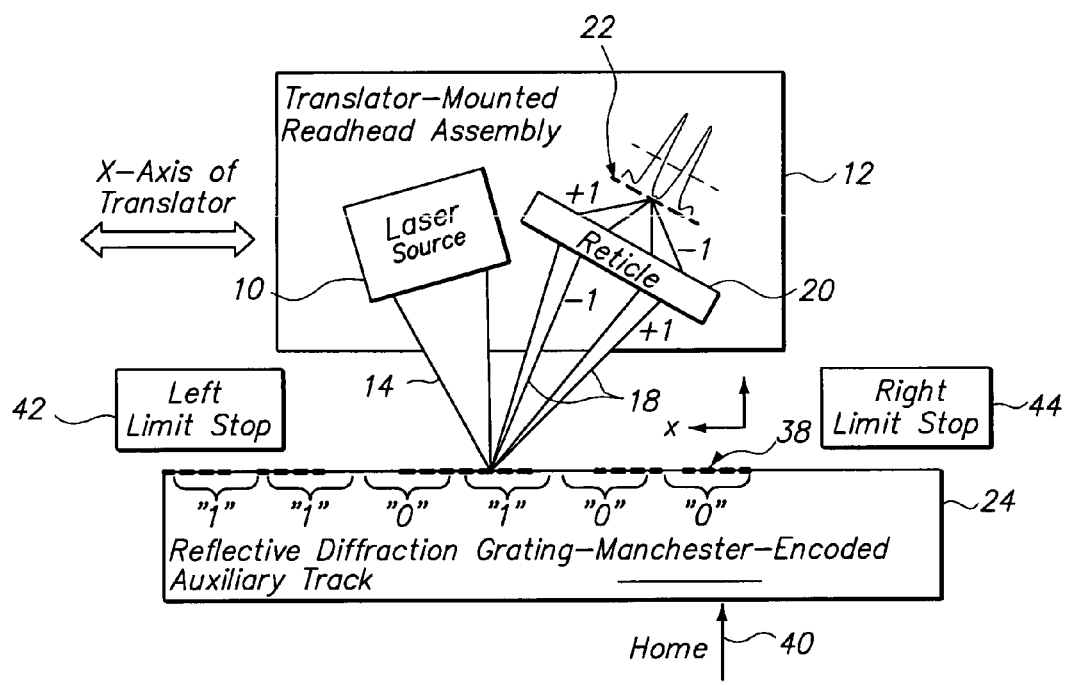
FIG. 5 is a system block diagram illustrating how the auxiliary track of the diffraction grating is read.

In order to read the absolute position along the diffraction grating 24, the system that controls the linear (or rotary) translator over the grating 24 would execute a calibration sequence prior to "fully automatic" operation. Referring to FIG. 5, the read head 12 directs the beam 14 from laser source 10 onto the auxiliary track 38. The reflected beam 18 is transmitted through reticle (transmissive diffraction grating) 20 and detected by photodiode array 22. In the calibration sequence, the read head 12 would detect the pattern of the auxiliary track 38 as a function of incremental motion along the x-axis. The phase of the binary sampling function would be defined by estimating the phase of the mid-point between successive binary transitions. Once this has been achieved, an N-bit sample of the auxiliary track 38 would be acquired through motion of the read head 12. Through either algorithmic or table-lookup techniques, the absolute position (unique binary code) can be determined. Referring to FIG. 5, the relative location of a home position 40 (a "safe" location defined by the programmer of the motion control system) and left and right limit stops 42, 44 (left/right end-of-travel defined by the programmer of the motion control system) can be calculated and stored as position offsets either in software or in programmable logic in hardware interlocks of the motion control system.

An alternative scheme may also be employed to determine absolute position of the read head assembly 12 with respect to the diffraction grating 24. A plurality of gratings 32 with slightly different spatial frequencies could be used with identical quadrature decoders. The phase angle of the quadrature signal for the ith track is equal to:

$$\phi_i = \tan^{-1}(Z_2(x), Z_1(x)) \qquad \text{Eq. 2}$$

By the appropriate choice of spatial frequencies for the N tracks, the vector $\phi = [\phi_1, \phi_2, \phi_3, \ldots, \phi_{N-1}, \phi_N]$ can be used to uniquely identify the absolute position once the phase vector $\phi_0$ of the home position 40 is known. Either a look-up table or algorithm can be used to calculate the absolute position. It will be recognized by those of ordinary skill in the art, that other absolute encoding techniques can be used for encoding absolute position.

The creation of the spatial frequencies of the gratings 32 can be developed in an ad hoc fashion by selecting a spatial frequency such that M periods would yield a given distance L on the grating 24. For instance, the value of M could be chosen such that M/10 is an integer. Three other tracks would be selected as M+1, M+M/10, M+M/10+1. Therefore it follows that $\phi_1$ and $\phi_3$ could uniquely define an absolute position $x_{13}$ within one of the ten equal contiguous sub-segments of L. It also follows that $\phi_2$ and $\phi_4$ could uniquely define an absolute position $x_{24}$ within one of the eleven contiguous sub-segments of L. Accordingly, $x_{13}$ and $x_{24}$ could uniquely define the absolute position, x, from x=0 to L, and $x_{13}$ and $x_{24}$ would each have the same value at x=0 and L. It is possible to calculate the probability of incorrectly calculating the absolute position given the signal-to-noise ratio in measurement of the vector $\phi$. The probability can be made arbitrarily small by adding track pairs with unique frequencies until the probability is below a user-defined threshold.

In addition to the forgoing, it will be recognized that other tracks can be written onto the diffraction grating 24 for other purposes. For example, multiple tracks with different grating periods could be written onto the diffraction grating 24 to create a multidimensional vernier effect from which a true absolute encoder can be created. By measuring the grating phase $\phi_i = \tan^{-1}(\text{Im}(Z-B), \text{Re}(Z-B))$ on N tracks, it is possible to uniquely determine the absolute position x with multiple laser stations or by slowing down the speed of the tape and writing the extra tracks with the same laser station.

Figure 6:
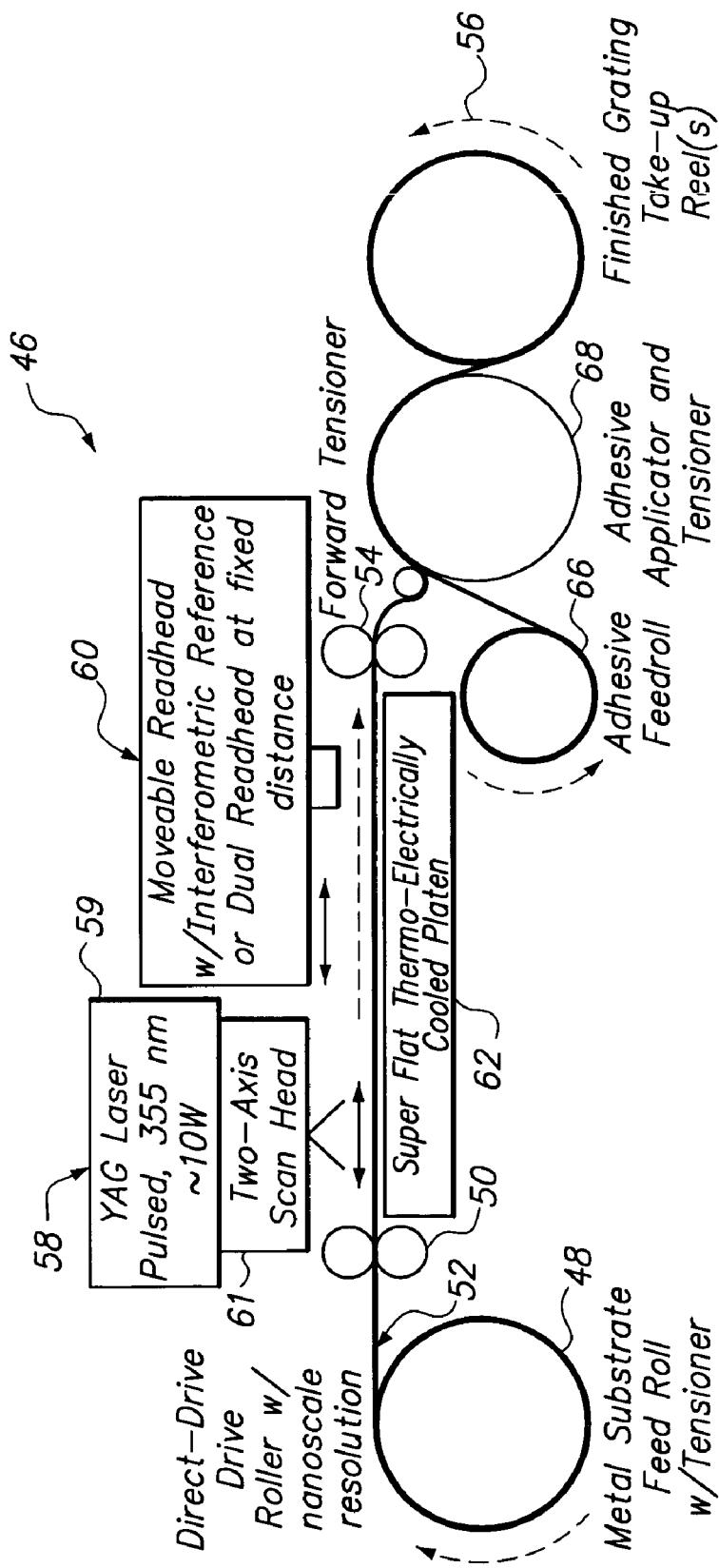
FIG. 6 is a system block diagram showing a system for manufacturing the diffraction grating of the present invention.

The diffraction grating 24 is created using a "direct-write" control system 46 as shown in FIG. 6. The system 46 can create diffraction gratings 24 to customer-specific lengths, grating periods, and auxiliary track features. The system 46 has a substrate feed roll 48 with tensioner. The substrate 26 with the adhesion layer 28 and surface layer 30 bonded thereto are wound around the substrate feed roll 48 and form a tape 52. A direct drive roller 50 having nanoscale resolution sets the velocity of the tape 52 as it is delivered from the feed roll 48. The direct drive roller 50 has a precision position transducer that enables the tape speed to be controlled down to 1 part per million (ppm). The tape 52 from the direct drive roller 50 is fed over an extremely flat platen 62 that is thermo-electrically cooled and is below a laser station 58 and a read head 60. The platen 62 is precision ground and temperature controlled to ensure a stable processing and measurement environment. As will be further explained below, the laser station 58 creates the grating lines 32 in the tape 52, while the read head 60 verifies that the grating lines 32 are properly spaced. The system 46 further includes a forward tensioner 54 that provides precision tension control of the tape 52 as it passes beneath the laser station 58 and read head 60. A take up reel 56 is used to roll the tape 52 (now diffraction grating 24) into a roll. The feed roll 48 and take up reel 56 are tensioned to maintain a small amount of tension within the tape 52 to ensure that the tape 52 remains flat and is not creased or bent as it travels across platen 62.

The laser station 58 has a Q-switched (355 nm) YVO laser 59 that is pulsed at 400 kHz. The Q-switched laser 59 and associated optics deliver laser intensity/fluence that is heavily skewed toward the first 10–20 picoseconds of the pulse which vaporizes rather than ablates the surface layer 30 of the tape 52. This allows the laser processing to be performed without an insulating "cover gas" (inert gas) that would increase the operating cost of producing the diffraction grating 24. Optionally, a cover gas could be used to keep the optics clean and to prevent redeposition of constituents.

In the first few hundred picoseconds of the laser pulse (e.g., 7–10 nano seconds), the laser vaporizes the surface layer 30 and some or all of the adhesion layer 28 thereby creating the alternating pattern of reflective and absorbing bands. By carefully controlling the energy in each laser pulse, the alternating band structure can achieve the desired 50% duty cycle that is necessary to achieve maximum amplitude. It will be recognized by those of ordinary skill in the art, that other types of lasers can be used if the laser provides the necessary energy profile to vaporize the surface layer 30.

Figure 7:
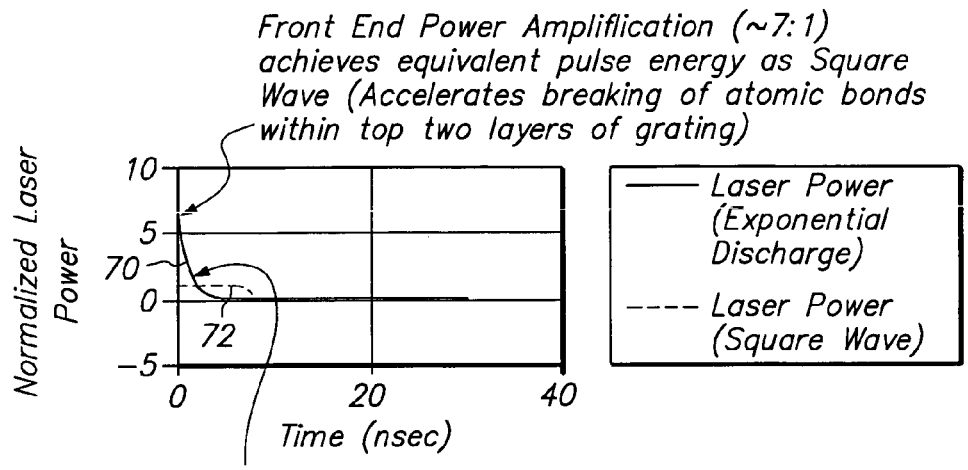
FIG. 7 is a graph showing how the power of the laser is distributed.

Referring to FIG. 7, the characteristics of the power profile for the laser pulse is shown. As illustrated, the front-end loaded power profile 70 optimally burns off the surface layer 30 and adhesion layer 28 by breaking the bonds linking the atoms within the thin metal films without heating (deforming) the substrate 26. Typically, the front-end power profile 70 is seven times greater than a square wage pulse 72 thereby accelerating the breaking of atomic bonds within the surface layer 30 and adhesion layer 28. Furthermore, the exponential pulse continues the burn off the surface layer 30 and the adhesion layer 28 because the time constant of the pulse is below the thermal time constant of the substrate 26. In an alternative embodiment, the surface layer may be made of a photo-imageable material and disposed on the adhesion layer 28.

Either a one or two axis scan head 61 of the laser station 58 directs the beam from the laser along a path defined in the coordinate system of the tape 52. The scan trajectory is synchronized with the tape motion so that the path of the laser spot from the Q-switched laser 59 is invariant (in tape coordinates) with variations in speed of the tape 52. Typically, the scan rate is approximately 250 mm/sec orthogonal to the axis of the tape 52, while the speed of the tape is between 10–40 mm/sec. The scan head 61 of the laser station 58 has a precision flexure assembly and actuator with angle feedback to ensure high-fidelity of scan patterns with no lost motion.

The read head 60 provides in-line testing of the diffraction grating 24 in order to determine whether the laser station 58 is writing correctly to the tape 52. The read head 60 will incorporate customer-specific electro-optical components and ride on a movable track in an oscillatory trajectory along the axis of motion of the tape 52. An interferometric reference records the movements of the read head 60. The read head 60 may incorporate a Nyquist period sensor for long term accuracy.

While moving in an oscillatory trajectory, the read head 60 measures the analog quadrature signals in real-time to process a vector $\phi(x,t)=[A(x), B(x), f(x), v(t)]$. By measuring the quadrature signals in this fashion, with different polarity of velocity across the surface, the grating spatial frequencies across the surface of the tape 52 can be estimated using non-linear filtering techniques (e.g., extended Kalman filter).

Figure 8:
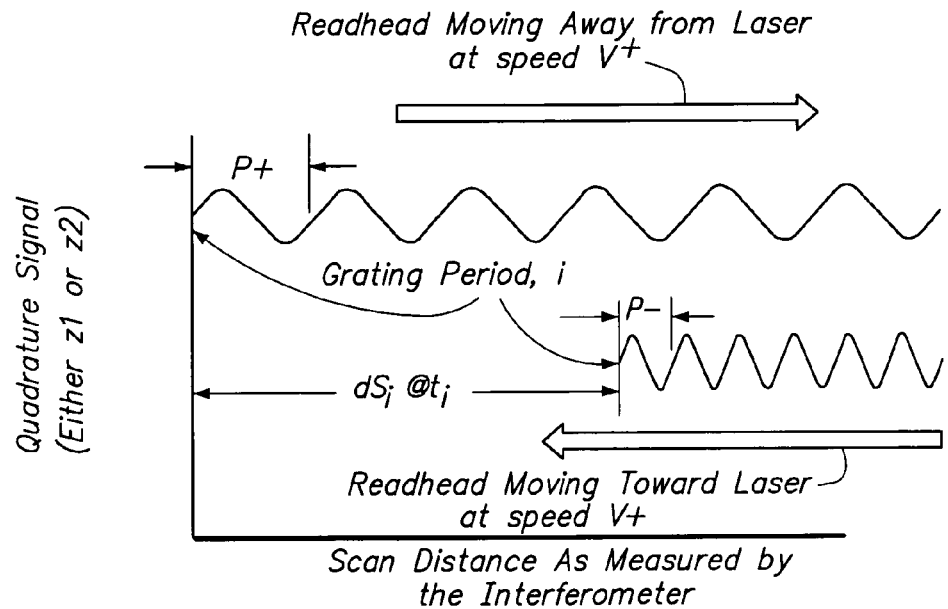
FIG. 8 is a graph showing how a read head can verifying the accuracy of a diffraction grating created with the system shown in FIG. 6.

Referring to FIG. 8, one or both quadrature signals ($z_1$ and/or $Z_2$) and the position and velocity of the read head 60 as measured by the interferometer are coherently sampled in time as the read head 60 oscillates above the tape 52. Each viewable grating period, i, is observed in both the forward and reverse direction of oscillation. The times $t_i^+$ and $t_i^-$, as well as read head positions $S_i^+$ and $S_i^-$ where the read head 60 samples an identical location within the $i^{th}$ grating period, uniquely provide an estimate of the tape speed as:

$$(S_i^+ - S_i^-)/(t_i^+ - t_i^-) \qquad \text{Eq. 3}$$

Similarly, by measuring the incremental time $dt_i^+$ and $dt_i^-$ to traverse the $i^{th}$ grating period and measuring the observed grating period $P_i^+$ and $P_i^-$, the true grating period $P_i$ can be determined. Therefore, by sampling the plurality of grating periods in view, there are redundant measurements from which the pitch and tape speed can be calculated. For this reason, linear filtering approaches can be used from which optimum estimates of the grating pitch and tape speed can be determined. Deviations of each value from a desired setpoint can be used to adjust the direct drive roller 50 and the scanning speed of the laser in the laser station 58 so as to generate the desired grating period. Variations in grating pitch can be saved in a "signature file" that can be delivered to the customer in the form of an electrically-erasable, programmable, read-only memory (EEPROM) or as an electronic file that can be delivered to the customer along with the diffraction grating 24.

If only a single stationary read head 60 is used, then the frequency of the quadrature signals would be the product of the tape speed and the spatial frequency of the grating. This could potentially yield large unobservable scale errors in the grating phase function $\phi = \phi_0 + 2\pi \int f(x) dx$.

Alternatively, two stationary read heads 60 separated by a known distance d can be used to determine the pitch of the diffraction grating. A nominal phase shift $\phi_d$ can be determined from the known distance d. Specifically:

$$\phi_d = 2\pi(d - \text{Integer}(d/\delta_0) * \delta_0)/\delta_0 \qquad \text{Eq. 4}$$

where $\delta_0$ is the nominal pitch (i.e., wavelength) of the grating and where the Integer function yields an integer result that truncates the fractional component of the positive argument.

The phase shift between the quadrature signal pairs from the two read heads would thus be known and would provide a reference signal from which an error signal could be derived once the system has been calibrated per Equation 4 above. Through appropriate control loop compensation, the speed of the direct drive roller 50 can be adjusted so as to drive the actual phase in coincidence with the reference phase.

In addition to the foregoing, the direct write control system 46 also includes a contact adhesive feed roll 66 for applying the optional contact adhesive 36 to the underside of the substrate 26. As previously described, the contact adhesive may also be discontinuous, glass bead filled epoxy.

Referring to FIG. 6, contact adhesive feed roll 66 contains a roll of contact adhesive 36. An adhesive applicator and tensioner 68 bonds the contact adhesive layer 36 to the underside of the substrate 36 as the tape 52 leaves the forward tensioner 54. In this respect, the contact adhesive 36 is applied to the substrate after passing through the laser station 58 and the read head 60.

Figure 9:
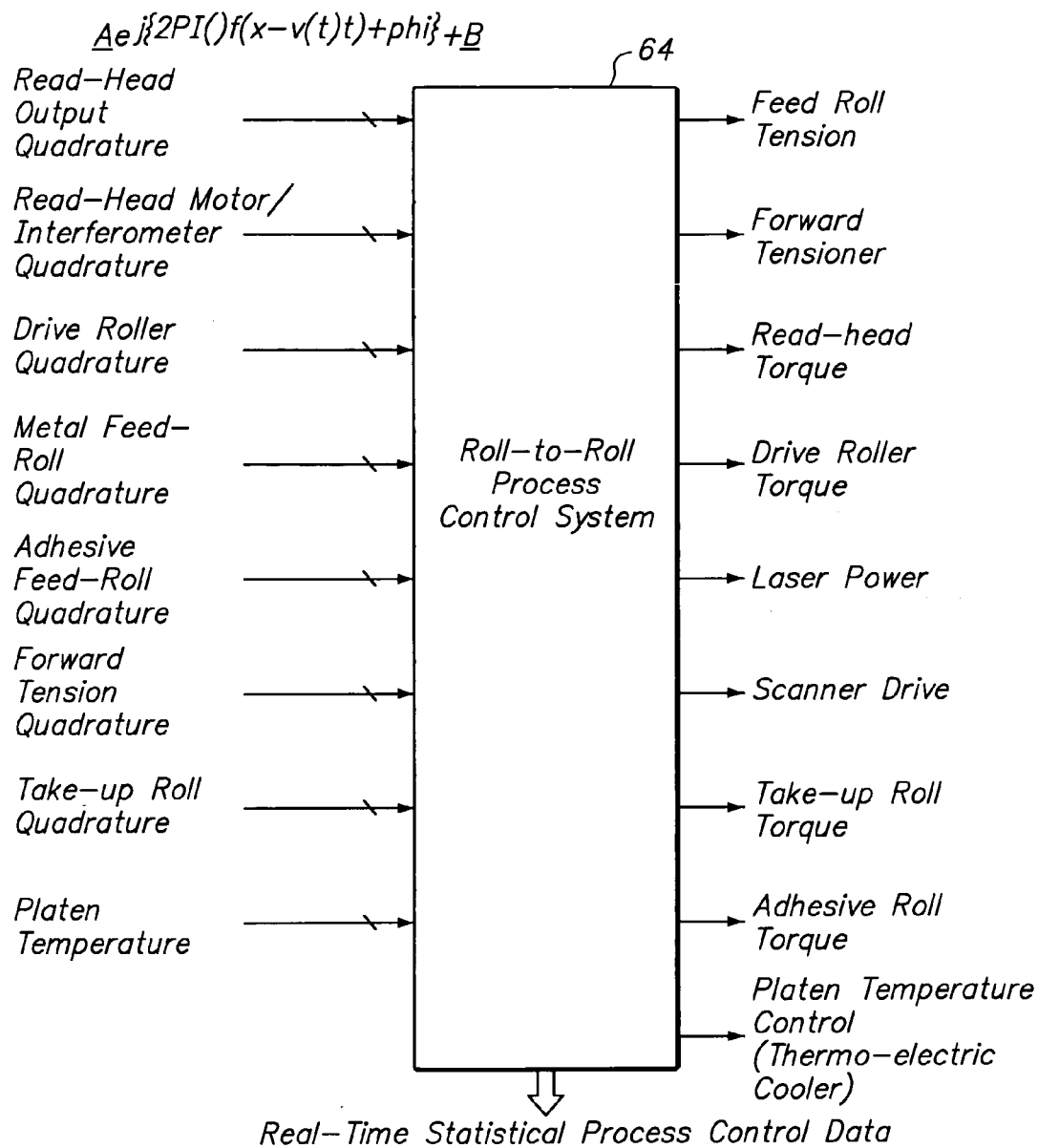
FIG. 9 is a block diagram showing the process control system used with the system shown in FIG. 6.

Referring to FIG. 9, a block diagram of a roll-to-roll process control system 64 is shown. The process control system 64 monitors rotation and tension of the feed roll 48, the direct drive roller 50, the take up reel 56, and the forward tensioner 54. Furthermore, the process control system 64 monitors the temperature of the platen 62 as well as other parameters. The control system 64 is operative to provide control signals to the feed roll 48, direct drive roller 50, forward tensioner 54, take up reel 56, laser station 58 and read head 60 in order to correctly write the grating lines 32 onto the tape 52. Furthermore, the process control system 64 controls the temperature of the platen 62 to reduce distortion and temperature-dependent error sources. The control system 64 also provides real-time statistical process control data-including deviations in grating period, quadrature amplitude and quadrature phase shift-which achieves the performance of the direct write control system 46. With the statistical process control data, the performance of the direct write control system 46 can be optimized over time.

Additional modifications and improvements of the present invention may also be apparent to those of ordinary skill in the art. In particular, the laser process may be applied directly to polished surfaces on the translator, the translator mounting platform, or on translator bearing elements to reduce assembly cost and parts count within the servo system. The particular combination of parts described and illustrated herein is intended to represent only certain embodiments of the present invention, and is not intended to serve as limitations of alternative devices within the spirit and scope of the invention.

What is claimed is:

1. A system for forming a reflective grating from a tape having a substrate, an adhesion layer, and a reflective surface layer affixed to the substrate by the adhesion layer, the system comprising:
    a feed roll having the tape rolled thereon;
    a drive roller for retrieving the tape from the feed roll;
    a laser for sequentially writing discrete grating lines with a laser spot generated by said laser onto the tape, said laser spot vaporizing portions of the reflective surface layer to expose the adhesion layer;
    a scan head for synchronizing a path of said laser spot with a motion of the tape so that the discrete grating lines are substantially orthogonal to the axis of motion of the tape; and
    a take-up reel for rolling the tape into a roll after being vaporized by the laser.

2. A system for forming a reflective grating as recited in claim 1 further comprising a read head for verifying that the laser has vaporized the portions of reflective surface layer, wherein said read head includes a laser source that emits a laser beam toward said discrete grating lines to generate a diffraction pattern and oscillates along the axis of motion of the tape and estimates spatial frequencies of the discrete grating lines by detecting and analyzing said diffraction pattern.

3. A system for forming a reflective grating as recited in claim 1 further comprising a contact adhesive feed roll for applying a strip of contact adhesive to the substrate.

4. A system for forming a reflective grating as recited in claim 1 wherein the laser is a high-frequency pulsed laser.

5. A system for forming a reflective grating as recited in claim 1 wherein the reflective surface layer is a photo imageable layer.

6. A system for forming a reflective grating tape, comprising:
    a feed roll having a tape rolled thereon, said tape including:
        a substrate layer;
        an adhesion layer disposed on the substrate layer; and
        a reflective surface layer disposed on the adhesion layer and affixed to the substrate layer by the adhesion layer;
    a direct drive roller for retrieving said tape from said feed roll and conveying said tape at a predetermined speed;
    a forward tension roller located downstream of said direct drive roller in a conveying direction of said tape and operative to apply a tension to a portion of said tape between said direct drive roller and said forward tension roller;
    a take-up reel for receiving said tape conveyed from said forward tension roller and winding said tape thereon;
    a platen positioned between said direct drive roller and said forward tension roller and including a surface that provides a precision ground for said tape when a side of said substrate opposite to said reflective surface layer is in contact with said surface;
    a laser; and
    a scan head for scanning a laser spot generated by said laser across the reflective surface layer to define discrete parallel lines on said reflective surface layer, said parallel lines being aligned substantially perpendicular to the conveying direction of said tape, said laser spot vaporizing said reflective surface layer along said parallel lines to generate grating lines as said tape is drawn across the surface of the platen.

7. A system for forming a reflective grating tape as recited in claim 6, further comprising:
    a movable read head including a laser source that emits a laser beam toward said grating lines to generate a diffraction pattern, said read head being caused to oscillate along the conveying direction of said tape and operative to detect and analyze said diffraction pattern in order to estimate spatial frequencies of said grating lines and to verify that said laser has vaporized said reflective surface layer along said parallel lines.

8. A system for forming a reflective grating tape as recited in claim 7, wherein said platen is flat and thermo-electrically cooled to maintain a stable temperature thereof and thereby to provide a stable environment for generating said diffraction pattern.

9. A system for forming a reflective grating tape as recited in claim 7, wherein said read head is selected from the group consisting of a single stationary read head and two stationary read heads.

10. A system for forming a reflective grating tape as recited in claim 7, further including a process control system that provides real-time statistical process control data including deviations in grating speed, quadrature amplitude and quadrature phase-shift of said diffraction pattern, said statistical data being used to optimize the performance of said system over time.

11. A system for forming a reflective grating tape as recited in claim 7, wherein said scan head includes a precision flexure assembly and an actuator with angle feedback to enhance fidelity level in scanning said diffraction pattern.

12. A system for forming a reflective grating tape as recited in claim 6, further comprising:
   a contact adhesive feed roll having an adhesive tape rolled thereon; and
   an adhesive applying roller for retrieving said adhesive tape from said contact adhesive feed roll and for continuously applying said adhesive tape to the side of said substrate layer opposite to said reflective surface layer.

13. A system for forming a reflective grating tape as recited in claim 6, further comprising:
   a process control system for monitoring rotations of said feed roll, direct drive roller, forward tension roller and take-up reel and operative to provide control signals to said feed roll, direct drive roller, forward tension roller and take-up reel so as to provide a stable movement of said tape as it is drawn over said platen.

14. A system for forming a reflective grating tape as recited in claim 13, wherein said process control system monitors the temperature of said platen and provides control signals to said platen so as to maintain a stable temperature thereof, and thereby to reduce distortion of said tape.

15. A system for forming a reflective grating tape as recited in claim 6, wherein said direct drive roller has a nanoscale resolution to control the conveying speed of said tape.

16. A system for forming a reflective grating tape as recited in claim 6, wherein said scan head is selected from the group consisting of an one axis scan head and a two axis scan head.

17. A system for forming a reflective grating tape as recited in claim 6, wherein said substrate layer is made of a material that has a low thermal expansion coefficient.

18. A system for forming a reflective grating tape as recited in claim 6, wherein said substrate layer is made of a material selected from the group consisting of Invar and Super Invar, said reflective layer is made of gold, and said adhesion layer is made of nickel.

19. A system for forming a reflective grating tape as recited in claim 6, wherein said laser spot vaporizes said adhesion layer along said parallel lines.

20. A system for forming a reflective grating tape as recited in claim 6, wherein said reflective surface layer is made of a photo-imageable material.

* * * * *